(12) United States Patent
Currivan et al.

(10) Patent No.: US 9,509,416 B2
(45) Date of Patent: Nov. 29, 2016

(54) INTERFERENCE CANCELLATION WITHIN OFDM COMMUNICATIONS

(71) Applicant: BROADCOM CORPORATION, Irvine, CA (US)

(72) Inventors: Bruce J. Currivan, Los Altos, CA (US); Thomas J. Kolze, Phoenix, AZ (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/032,359

(22) Filed: Sep. 20, 2013

(65) Prior Publication Data

US 2014/0079103 A1 Mar. 20, 2014

Related U.S. Application Data

(60) Provisional application No. 61/703,766, filed on Sep. 20, 2012, provisional application No. 61/723,272, filed on Nov. 6, 2012, provisional application No. 61/733,398, filed on Dec. 4, 2012, provisional application No. 61/733,401, filed on Dec. 4, 2012, provisional application No. 61/874,230, filed on Sep. 5, 2013.

(51) Int. Cl.
| | |
|---|---|
| *H04B 1/38* | (2015.01) |
| *H04B 15/00* | (2006.01) |
| *H04L 5/00* | (2006.01) |
| *H04J 11/00* | (2006.01) |
| *H04L 27/26* | (2006.01) |
| *H04L 25/02* | (2006.01) |

(52) U.S. Cl.
CPC ........... *H04B 15/00* (2013.01); *H04J 11/0066* (2013.01); *H04L 5/0062* (2013.01); *H04L 27/2646* (2013.01); *H04L 25/0224* (2013.01)

(58) Field of Classification Search
CPC ............. H04L 5/0062; H04L 27/2647; H04L 25/03821; H04B 15/00; H04J 11/004; H04J 11/0066
USPC .......................... 375/222, 219, 144, 285, 257
See application file for complete search history.

(56) References Cited

U.S. PATENT DOCUMENTS

| | | | |
|---|---|---|---|
| 7,072,410 B1 * | 7/2006 | Monsen ......................... | 375/260 |
| 7,334,253 B2 * | 2/2008 | Howard ........................ | 725/111 |
| 7,643,538 B2 * | 1/2010 | Currivan et al. ............. | 375/144 |
| 7,643,811 B2 * | 1/2010 | Reunamaki et al. ....... | 455/226.2 |
| 2009/0304095 A1 * | 12/2009 | Chauncey et al. ........... | 375/260 |
| 2010/0111141 A1 * | 5/2010 | Currivan et al. ............. | 375/144 |
| 2012/0288017 A1 * | 11/2012 | Stadelmeier et al. ........ | 375/257 |
| 2013/0070826 A1 * | 3/2013 | Nielsen et al. ............... | 375/222 |

* cited by examiner

*Primary Examiner* — Helene Tayong
(74) *Attorney, Agent, or Firm* — Garlick & Markison; Shayne X. Short

(57) ABSTRACT

Many communication systems operate based on orthogonal frequency division multiplexing (OFDM) signaling and/or orthogonal frequency division multiple access (OFDMA) signaling. Within such systems, narrowband interference, which may alternatively be referred to as narrowband ingress, narrowband ingress interference, narrowband noise, etc., may adversely affect one or more subcarriers or tones causing a reduction in performance or even link failure. Such narrowband interference may affect only one or a relatively few tones employed within such communications. When the narrowband interference is identified, a transmission may then be made including one or more information-free tones. A device that receives such a transmission then uses those information-free tones to reduce or cancel the narrowband interference. Such processing may be performed in the frequency-domain, the time domain, or both.

20 Claims, 8 Drawing Sheets

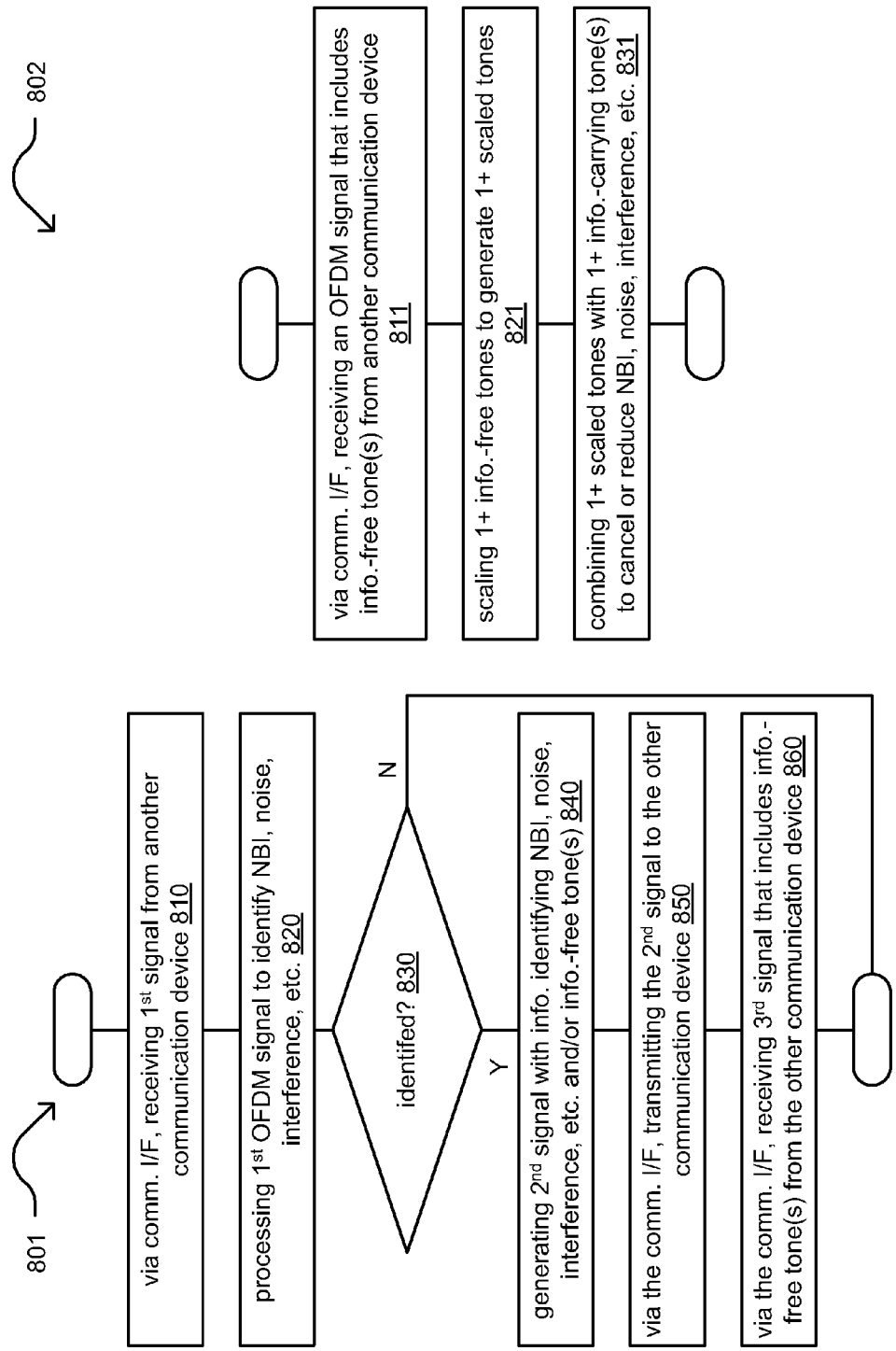

INTERFERENCE CANCELLATION WITHIN OFDM COMMUNICATIONS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Patent Application Ser. No. 61/703,766, entitled "Subspace cancellation techniques," filed Sep. 20, 2012.

2. U.S. Provisional Patent Application Ser. No. 61/723,272, entitled "Narrowband interference cancellation in OFDM communications," filed Nov. 6, 2012.

3. U.S. Provisional Patent Application Ser. No. 61/733,398, entitled "Orthogonal frequency division multiplexing (OFDM) communication device with variable filtering," filed Dec. 4, 2012.

4. U.S. Provisional Patent Application Ser. No. 61/733,401, entitled "Mitigating narrowband ingress with orthogonal frequency division multiplexing (OFDM) communications," filed Dec. 4, 2012.

5. U.S. Provisional Patent Application Ser. No. 61/874,230, entitled "Interference cancellation within OFDM communications," filed Sep. 5, 2013.

BACKGROUND

1. Technical Field

The present disclosure relates generally to communication systems; and, more particularly, to signal processing including interference cancellation within such communication systems.

2. Description of Related Art

Data communication systems have been under continual development for many years. The primary goal within such communication systems is to transmit information successfully between devices. Unfortunately, many things can deleteriously affect signals transmitted within such systems resulting in degradation of or even complete failure of communication. Examples of such adverse effects include interference and noise that may be caused by a variety of sources including other communications, low-quality communication links, degraded or corrupted interfaces and connectors, etc.

Present technologies address some but certainly not all of the deficiencies that can exist and adversely affect communications within such communication systems. There continues to be much room for improvement related to identifying and eliminating such adverse effects to help improve such communications. As such adverse effects may be effectively reduced or even eliminated, a greater amount of information may be successfully transmitted between devices within a given time.

BRIEF DESCRIPTION OF THE SEVERAL VIEWS OF THE DRAWINGS

FIG. 8A is a diagram illustrating an embodiment of a method for execution by one or more communication devices.

FIG. 8B is a diagram illustrating another embodiment of a method for execution by one or more communication devices.

DETAILED DESCRIPTION

Figure 1:
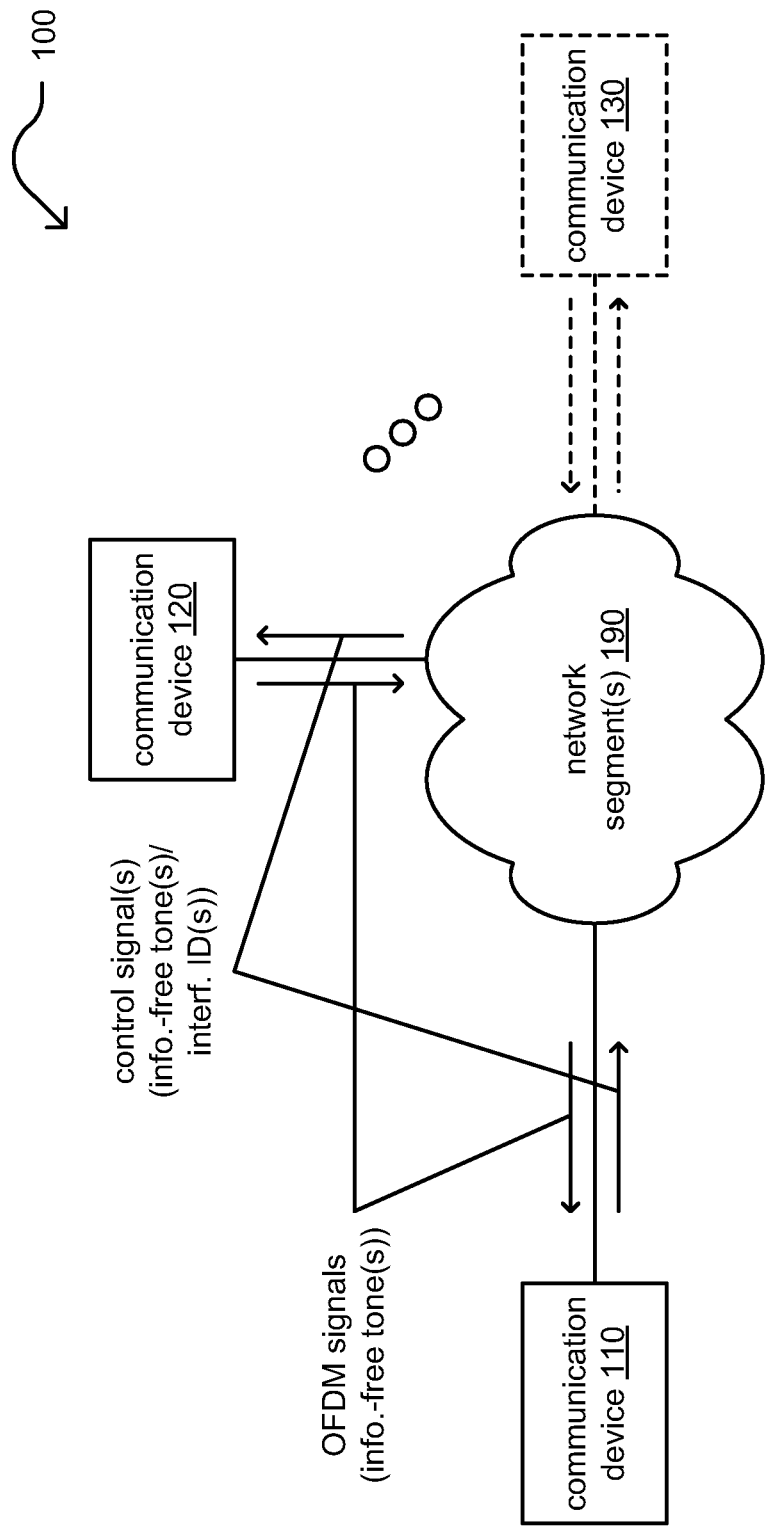
FIG. 1 is a diagram illustrating an embodiment of one or more communication systems.

FIG. 1 is a diagram illustrating an embodiment 100 of one or more communication systems. One or more network segments 190 provide communication inter-connectivity for at least two communication devices 110 and 120. Generally speaking, any desired number of additional communication devices are included within one or more communication systems (e.g., as shown by communication device 130). Some or all the various communication devices 110-130 include capability to perform interference identification and/or cancellation.

The various communication links within the one or more network segments 190 may be implemented using any of a variety of communication media including communication links implemented as wireless, wired, optical, satellite, microwave, etc. communication links. Also, in some instances, communication links of different type may cooperatively form a connection pathway between any two communication devices. Considering one possible example, a communication pathway between devices 110 and 120 may include some segments of wired communication links and other segments of optical communication links.

In an example of operation, device 110 receives a signal transmitted from device 120 using orthogonal frequency division multiplexing (OFDM) signaling. The device 110 is configured to process that signal to identify narrowband interference that may exist in the signal using any desired means. Such narrowband interference may be referred to as narrowband ingress, narrowband ingress interference, narrowband noise, etc., and such narrowband interference may unfortunately adversely affect one or more subcarriers or tones of one or more OFDM symbols causing a reduction in performance or even a failure entirely of communications between devices 110 and 120. Upon identification of such narrowband interference, device 110 is configured to generate a signal that includes information identifying one or more information-free tones. Such information-free tones will generally be located near the identified narrowband interference. The device 110 then transmits the signal identifying the one or more information-free tones to device 120, and device 120 then transmits another signal, which is based on a modified OFDM signaling that includes the one or more information-free tones.

The device 110 then receives this other signal that has been transmitted using one or more information-free tones and uses them to reduce or cancel the narrowband interference that may adversely any information-carrying tones. In an example of operation, device 110 receives this signal with one information-free tone, and the device 110 scales that information-free tone to generate a scaled tone for combination with a tone located at or in the vicinity of the narrowband interference. This combined resultant may then undergo subsequent processing including decoding, slicing, etc. to make estimates of any information bits encoded therein.

Figure 2:
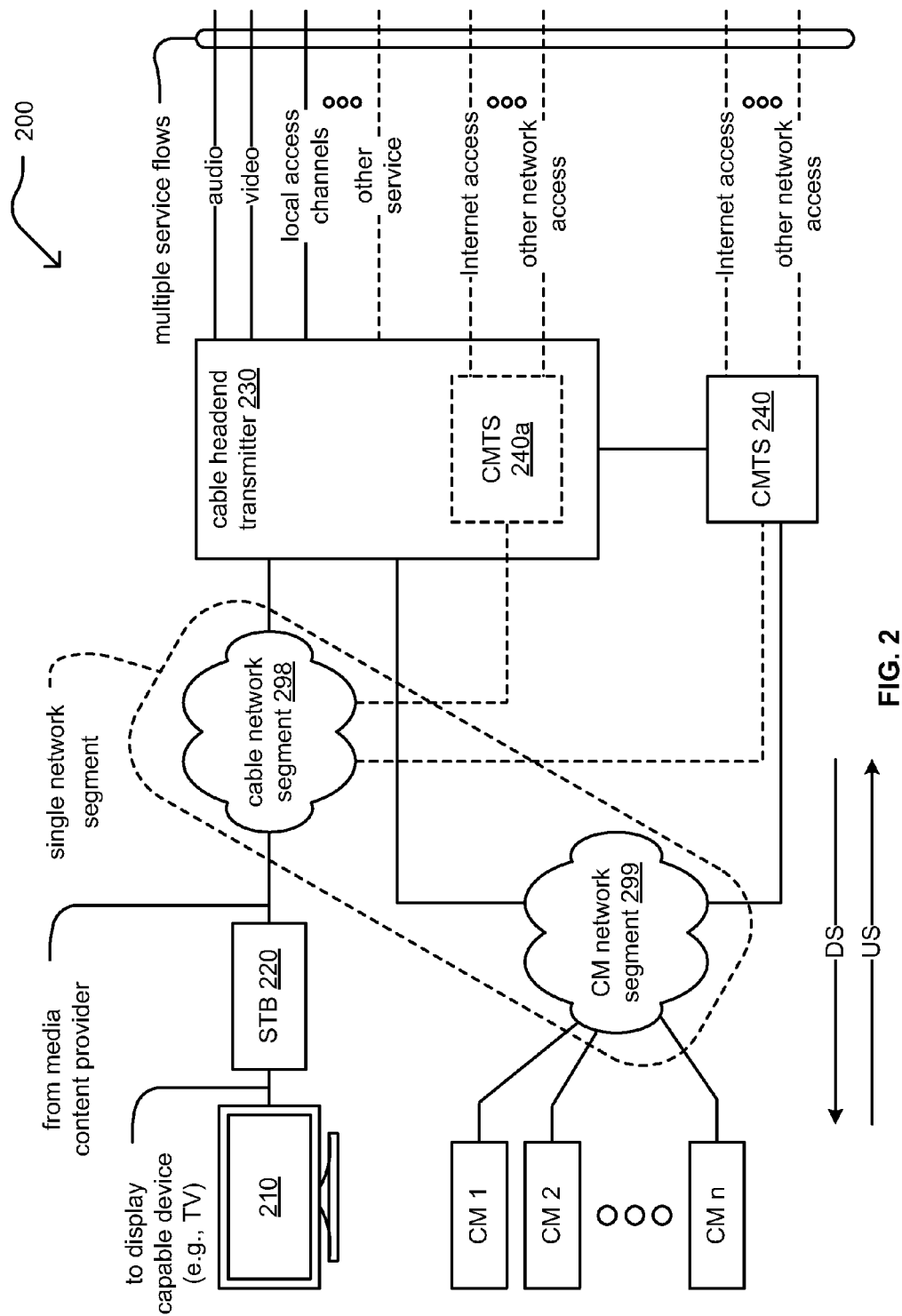
FIG. 2 is a diagram illustrating another embodiment of one or more communication systems.

FIG. 2 is a diagram illustrating another embodiment 200 of one or more communication systems. A cable headend transmitter 230 provides service to a set-top box (STB) 220 via cable network segment 298. The STB 220 provides output to a display capable device 210. The cable headend transmitter 230 can support any of a number of service flows such as audio, video, local access channels, as well as any other service of cable systems. For example, the cable headend transmitter 230 can provide media (e.g., video and/or audio) to the display capable device.

The cable headend transmitter 230 may provide operation of a cable modem termination system (CMTS) 240a. That is to say, the cable headend transmitter 230 may perform such CMTS functionality, or a CMTS may be implemented separately from the cable headend transmitter 230 (e.g., as shown by reference numeral 240). The CMTS 240 can provide network service (e.g., Internet, other network access, etc.) to any number of cable modems (shown as CM 1, CM 2, and up to CM n) via a cable modem (CM) network segment 299. The cable network segment 298 and the CM network segment 299 may be part of a common network or common networks. The cable modem network segment 299 couples the cable modems 1-n to the CMTS (shown as 240 or 240a). Such a cable system (e.g., cable network segment 298 and/or CM network segment 299) may generally be referred to as a cable plant and may be implemented, at least in part, as a hybrid fiber-coaxial (HFC) network (e.g., including various wired and/or optical fiber communication segments, light sources, light or photo detection complements, etc.).

A CMTS 240 or 240a is a component that exchanges digital signals with cable modems 1-n on the cable modem network segment 299. Each of the cable modems is coupled to the cable modem network segment 299, and a number of elements may be included within the cable modem network segment 299. For example, routers, splitters, couplers, relays, and amplifiers may be contained within the cable modem network segment 299. Generally speaking, downstream information may be viewed is that which flows from the CMTS 240 to the connected cable modems (e.g., CM 1, CM2, etc.), and upstream information is that which flows from the cable modems to the CMTS 240.

At least some of the devices within this diagram are implemented to perform interference identification and/or cancellation. In one example of operation, a cable modem (e.g., CM 1) includes a communication interface configured to receive a first signal transmitted using OFDM signal from the cable head end transmitter 230, the CMTS 240, or the CMTS 240a implemented within the cable head end transmitter 230. The cable modem then processes that received signal to identify and quantify narrowband interference included therein. Based upon that identified narrowband interference, the cable modem then generates and transmits a second signal that identifies one or more information-free tones to be used in subsequent transmissions from the device 230 (or 240, or 240a). Upon receipt of this second signal from the cable modem, the device 230 (or 240, or 240a) generates and transmits a third signal using OFDM signaling that includes one or more information-carrying tones and one or more information-free tones. An information-free tone may be adjacently located to an information-carrying tone.

The cable modem then processes the third signal by scaling one or more information-free tones using one or more weights to generate one or more scaled tones. The cable modem then combines the one or more scaled tones with one or more information-carrying tones to reduce or cancel any narrowband interference that may adversely have affected the one or more information-carrying tones.

Note that such narrowband interference may affect the communication system differently over time, and such narrowband interference may also vary in terms of its location in frequency. Interaction between a transmitter and receiver device allows for adaptation in terms of interference identification and/or cancellation. In one example in which the magnitude narrowband interference may vary over time, a first number of information-free tones may be employed to cancel the narrowband interference turning a first time, and a second number of information-free tones may be employed to cancel the narrowband interference at a second time. Within OFDM systems, such narrowband interference will typically adversely affect one or a few of adjacently located tones. However, since the magnitude of such narrowband interference may vary, different numbers of information-free tones may be used at different times to cancel that time varying narrowband interference. Differing numbers of information-free tones located near narrowband interference will occupy different proximities around the narrowband interference.

Figure 3:
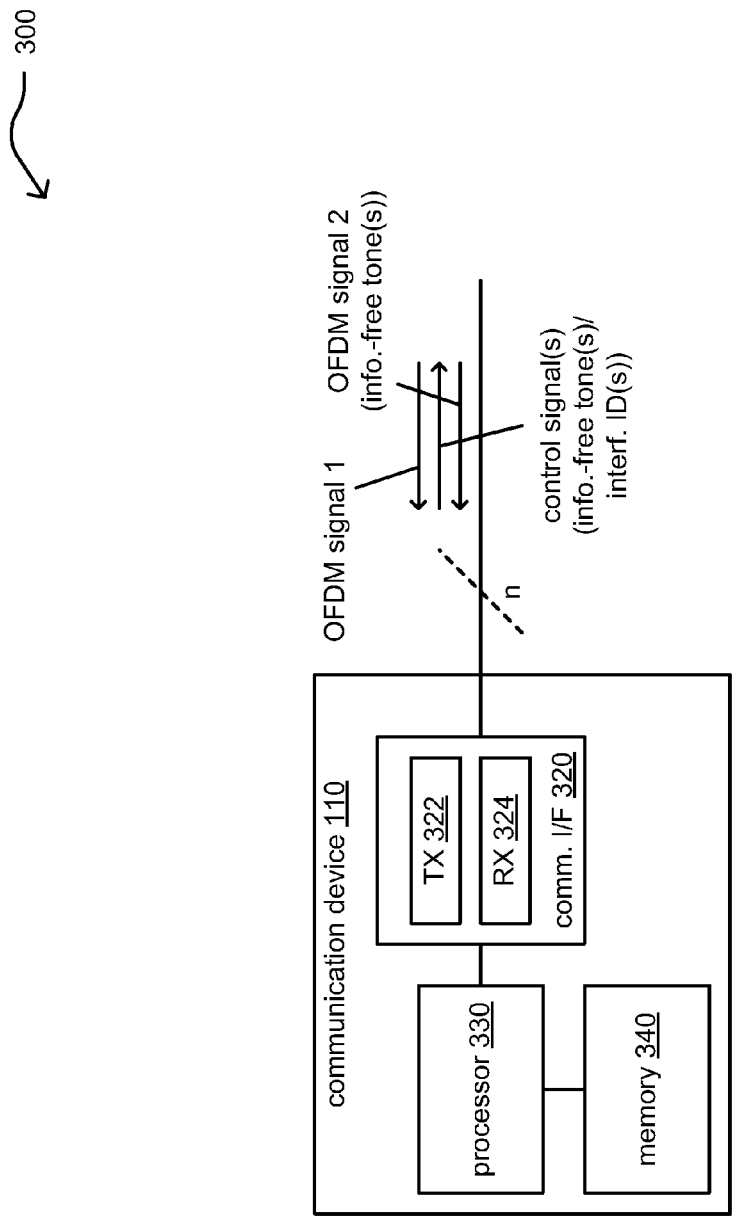
FIG. 3 is a diagram illustrating a communication device operative within one or more communication systems.

FIG. 3 is a diagram illustrating a communication device 110 operative within one or more communication systems. The device 110 includes a communication interface 320 and a processor 330. The communication interface 320 includes functionality of a transmitter 322 and the receiver 324 to support communications with one or more other devices within a communication system. The device 110 may also include memory 340 to store information including identification of the location and number of information-free tones generated by the device 110 or such information received from other devices via one or more communication channels. Memory 340 may also include and store various operational instructions for use by the processor 330 in regards to the interference identification and/or cancellation described herein. Memory 340 may also include and store values of various weights that may be used to scale one or more information-free tones for use in reducing or canceling narrowband interference.

The device 110 operates to transmit and receive signals to and from other devices within the communication system using OFDM. For example, the communication interface 320 may be configured to transmit OFDM signals that include one or more information-free tones for use by a receiving device (e.g., device 120) to cancel narrowband interference that may adversely affect one or more information-carrying tones. Also, the communication interface 320 may be configured to receive OFDM signals that include one or more information-free tones for use by the device 110 to cancel narrowband interference.

The device 110 may be configured to interact with other devices in the one or more communication systems to reduce the likelihood of performance loss or failure of communications between the device 110 and the other devices. Note that narrowband interference of different magnitudes and locations in frequency may exist among different communication links within the one or more communication systems. The device 110 may perform a first type of interference cancellation for communications with a first other device (e.g., device 120) and a second type of interference cancellation for communications with a second letter device (e.g., device 130). Also, the device 110 may modify and adapt interference cancellation performed for communications with any given device as narrowband interference affecting a communication pathway between device 110 and that device may vary over time.

Figure 4:
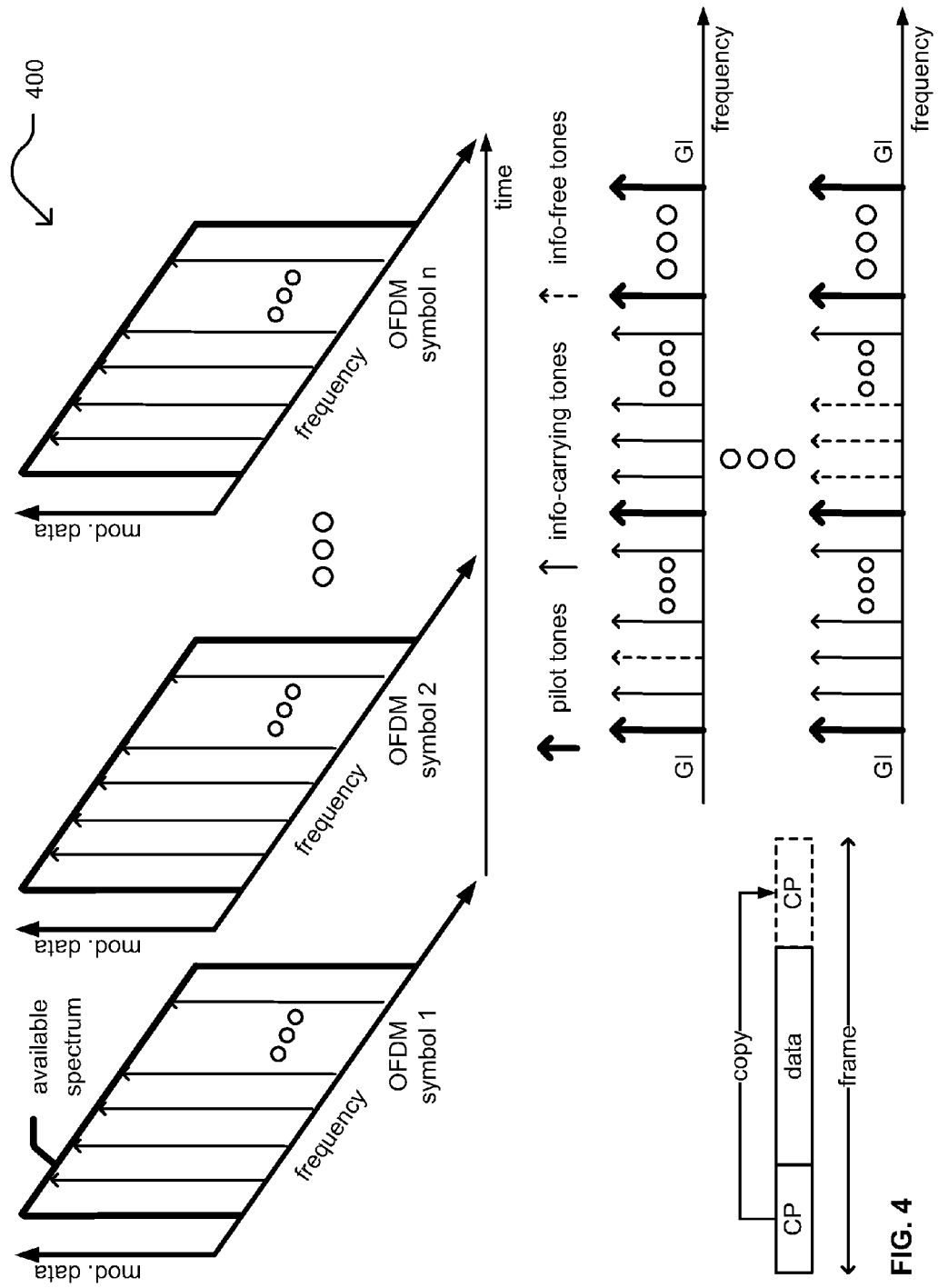
FIG. 4 is a diagram illustrating an example of orthogonal frequency division multiplexing (OFDM).

FIG. 4 is a diagram illustrating an example 400 of orthogonal frequency division multiplexing (OFDM). Orthogonal frequency division multiplexing (OFDM) modulation may be viewed a dividing up an available spectrum into a plurality of narrowband sub-carriers (e.g., lower data rate carriers). Typically, the frequency responses of these sub-carriers are overlapping and orthogonal. Each sub-carrier may be modulated using any of a variety of modulation and/or coding techniques.

OFDM modulation may operate by performing simultaneous transmission of a large number of narrowband carriers (or multi-tones). An OFDM symbol may include pilot tones for use in channel estimation characterization and information-carrying tones that carry information to be transmitted from one device to another. Information-free tones may be included within an OFDM symbol to perform interference cancellation. A guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. Note that an OFDMA frame may include more than one OFDM symbol. In addition, a CP (Cyclic Prefix) may also be employed within the guard interval to allow switching time, such as when jumping to a new communication channel or sub-channel, and to help maintain orthogonality of the OFDM symbols. Generally speaking, an OFDM system design is based on the expected delay spread within the communication system (e.g., the expected delay spread of the communication channel).

Note also that the interference identification and/or cancellation described in this disclosure may also be applied to orthogonal frequency division multiplexing (OFDM) signaling. Comparing OFDMA to OFDM, OFDMA is a multi-user version of the popular orthogonal frequency division multiplexing (OFDM) digital modulation scheme. Multiple access is achieved in OFDMA by assigning subsets of subcarriers to individual recipient devices for users. Generally speaking, such interference identification and/or cancellation described herein may be applied to any orthogonal based signaling scheme that may be used in communications. The information-free tones and information-carrying tones would be replaced by information-free orthogonal signal components and information-carrying orthogonal signal components in another orthogonal based signaling scheme (e.g., codes within code division multiple access (CDMA), synchronous code division multiple access (S-CDMA), time division multiple access (TDMA), etc.).

When narrowband interference is identified, one or more information-free tones are included within subsequent communications for use in canceling the narrowband interference. The location and number of such information-free tones will be based upon the location and magnitude of the narrowband interference. Generally, narrowband interference will affect one or a few of adjacently located information-carrying tones. A relatively larger number of information-free tones that occupy a relatively larger proximity near or around one or more affected information-carrying tones would be needed to perform interference cancellation for relatively larger narrowband interference than for relatively smaller narrowband interference. Considering an example of operation, two information-free tones located next to or near an affected information-carrying tone may be adequate to perform cancellation of relatively small magnitude narrowband interference. Alternatively, a relatively larger number (e.g., five) information-free tones located next to or near an affected information-carrying tone may be appropriate to perform cancellation of relatively large magnitude narrowband interference. Note also that the information-free tones may be adjacently located or contiguous with one another and located to one or both sides of one or more affected information-carrying tones. In other instances, note that the information-free tones may be intermingled or interspersed among certain information-carrying tones. The location of information-free tones may vary on a frame by frame basis or even on a symbol by symbol basis within one or more frames based on the narrowband interference that affects one or more communication links between devices. For example, a first frame may include information-free tones having a first distribution among the information-carrying tones, and the second frame may include information-free tones having a second distribution among the information-carrying tones.

Figure 5:
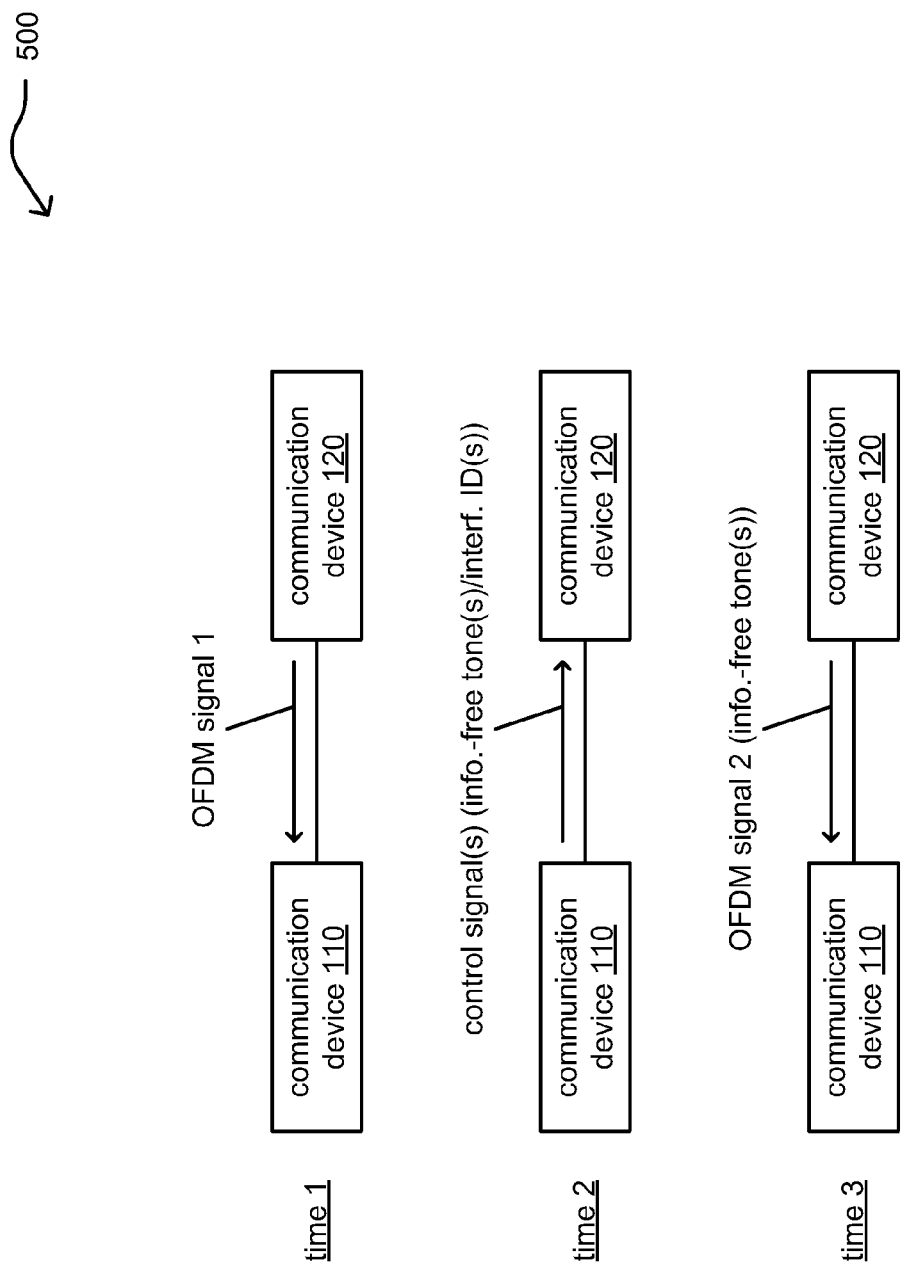
FIG. 5 is a diagram illustrating an example of communication between two communication devices.

FIG. 5 is a diagram illustrating an example 500 of communication between two communication devices. At or during time 1, device 110 receives a first OFDM signal from device 120 via a communication pathway between those devices. The first OFDM signal will typically include pilot tones and information-carrying tones. In some instances, the first OFDM signal may also include information-free tones; however, the first OFDM signal may include only pilot tones and information-carrying tones. The device 110 identifies any narrowband interference existence within the first OFDM signal. The device 110 may use any means to identify such narrowband interference. The device 110 may also identify such narrowband interference based on information received from one or more other devices, including device 120, within the communication system. Once the narrowband interference has been identified, the device 110 generates one or more control signals to be transmitted to the device 120. The one or more control signals include information related to one or more information-free tones, one or more characterizations of narrowband interference such as location and magnitude of such interference, and/or any additional information related to the characterization of and cancellation of such narrowband interference. The one or more control signals may be transmitted using any desired signaling scheme including OFDM signaling.

Based on information included within the one or more control signals received from the device 110, the device 120 then generates and transmits a second OFDM signal to the device 110. This second OFDM signal includes one or more information-free tones for use by the device 110 to reduce or cancel narrowband interference that may adversely affect information-carrying tones within the second OFDM signal. Appropriate coordination and interaction between devices within a communication system allows for effective adaptation to narrowband interference that may be time varying. For example, the magnitude and/or location of narrowband interference adversely affecting a communication pathway between devices 110 and 120 may be different at different times. Note also that there may be times in which there is negligible or no narrowband interference adversely affecting the communication pathway between devices 110 and 120. In such instances, an OFDM signal may be transmitted without any information-free tones and therefore carrying relatively more information than an OFDM signal that includes one or more information-free tones.

Figure 6:
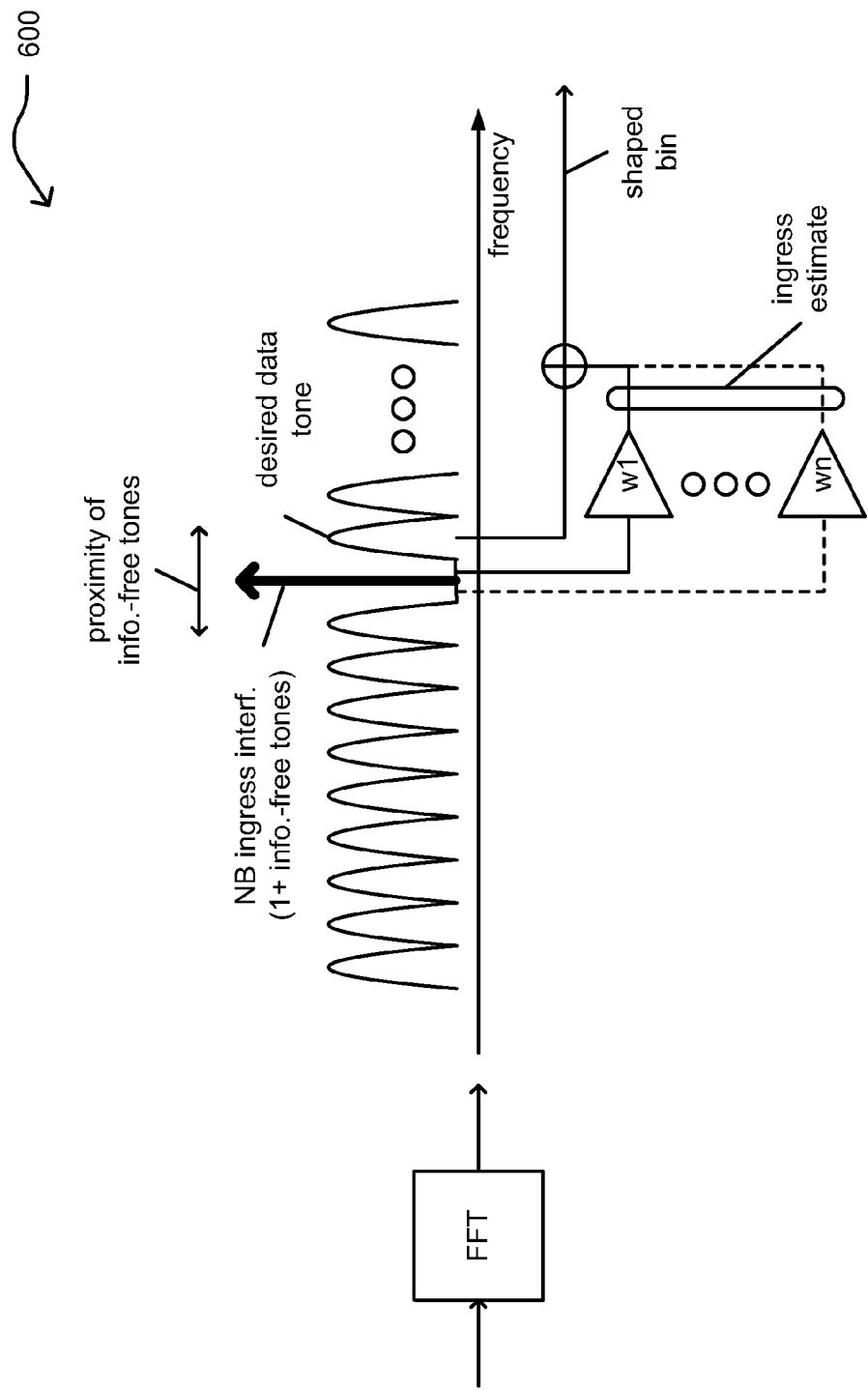
FIG. 6 is a diagram illustrating an example of signal processing to perform interference cancellation.

FIG. 6 is a diagram illustrating an example 600 of signal processing to perform interference cancellation. The operations performed in this diagram may be performed in any communication device including those described above, such as devices 110, 120, 130 in FIG. 1 or any of the devices described with reference to FIG. 2.

A device receives a signal via its communication interface and performs appropriate processing to generate a signal suitable for undergoing fast Fourier transform (FFT) processing. Such preliminary processing within device may include demodulation, digital sampling, filtering, gain adjustment, etc. and/or any other processes performed within a communication device including those performed within an analog front end (AFE).

The received signal is implemented in the time domain (e.g., a continuous time signal that has been transmitted from another device). The device transforms the signal from the time domain to the frequency-domain in an FFT operation. This signal includes one or more information-free tones for use in reducing or canceling narrowband interference that may be generated by a narrowband ingress interferer. The transmitted OFDM received signal enters the receiver and an FFT is taken, and the result is a frequency-domain signal that can include a large number of tones (e.g., typically 1000 or more) of tones. In the middle of the band, a strong narrowband interferer (e.g., "NB ingress interf.") is shown protruding above the signal spectrum. Evidently, the OFDM tone or tones directly under the interferer are badly corrupted by the interference.

In one example of operation, assume that two tones are badly corrupted, and many other tones nearby are partially corrupted. The badly corrupted tones are then implemented as information-free tones. The device may identify the condition of two corrupted tones within a first signal received from the transmitting device. The device identifies the narrowband interference, and then generates and transmits one or more control signals to the transmitter device instructing it to suppress (turn off or quiet) these two OFDM tones around the ingress frequency. These may be considered as the information-free tones or alternatively, "inactive tones". The use of such information-free tones by turning off one or more transmit tones is practical for narrowband interference is frequency is stationary. Note that one or more devices within the communication system may include the capability to determine the frequency of the narrowband interference (e.g., spectrum analysis functionality). Such determined information may be communicated among the various devices within the system.

Due to spectral leakage in the FFT bin response (e.g., the resultant response of FFT processing of a number of signal samples, which may include multiple tones), the data carrying tones surrounding the identified desired data tone (i.e., the tone currently being processed) will still have some contribution from the narrowband interference or ingress noise. This leakage noise can be canceled using the interference cancellation described herein. Note that certain implementations, including that described in FIG. 6, perform the cancellation after the receive FFT, such processing may alternatively be performed in the time domain before the FFT as well in other implementations.

Consider a data-carrying FFT bin and the one or more information-free or inactive bins adjacent or nearly adjacent to the data carrying FFT bin. The data-carrying FFT bin contains one or more symbols to be estimated (e.g., modulated using any desired modulation such as quadrature amplitude modulation (QAM), 16 QAM, amplitude phase shift keying (APSK), etc.). The information-free or inactive bins would contain no energy in an ideal channel (other than thermal noise). However, after being affected by narrowband interference, these information-free or inactive bins will unfortunately contain samples of the ingress noise.

The reduction or cancellation of such narrowband interference may be performed by generating a linear combination of desired data bin and the one or more information-free or bins. This linear combination shown in the diagram as weights w1 through w2 multiplied times one or more corresponding information-free or inactive tone outputs from the FFT. After being appropriately scaled by the weights w1 through w2, the scaled tones are added to the desired tone output to generate a shaped bin having reduced or canceled narrowband interference. This linear combination operation is effective to cancel or reduce the narrowband interference that may be existent in the desired data bin. The scaled tones, generated from one or more information-free or inactive tones, operate to subtract an estimate of the narrowband interference or ingress noise (e.g., the ingress estimate) from the desired signal to cancel. The bin generated by this signal processing may be called a shaped bin.

Note that the one or more weights w1 through w2 may be computed ahead of time or off-line based on a previously known or assumed power spectral density (PSD) of the narrowband interference. The assumed PSD may be an upper bound or maximum-hold function of the PSD of the expected interference. Alternatively, real-time identification and quantification of the narrowband interference may be used to calculate the one or more weights w1 through w2 for use in canceling such narrowband interference. This latter approach may be preferable within applications that have time varying narrowband interference.

While it is noted that such signal processing may be generally performed within any orthogonal based signaling scheme, there are certain characteristics associated with OFDM that are not necessarily existent in other orthogonal signaling schemes. For example, due to the compact nature of the OFDM response to narrowband interference, especially with windowed or shaped OFDM, only a few adjacent bins are typically needed to be included in the narrowband interference canceling operations. This is because such narrowband interference is generally quite localized in terms of frequency. The effect of such narrowband interference will typically not affect tones relatively far away from the center of the narrowband interference. Those bins located several bins away from the narrowband interference may be virtually not affected at all. The number of adjacently affected tones or bands will depend on the magnitude of the narrowband interference and other factors. However, the adverse effects of such narrowband interference will typically diminish significantly based on the OFDM bin response, and interference cancellation may not be needed for bins located sufficiently away from the narrowband interference. Interference cancellation need not necessarily be performed for all tones within a received signal, but instead for only those tones located within a given proximity of the narrowband interference. This proximity will be different for different magnitudes of narrowband interference and for different OFDM shaping functions.

As one example comparing orthogonal based signaling schemes, comparing OFDM signaling to S-CDMA signaling, in S-CDMA, every despreader resultant (or bin) required ingress cancellation due to the wideband frequency response of the S-CDMA codes, while in OFDM only a few bins near the ingress frequency require cancellation. The particular characteristics of OFDM signaling allow for such interference cancellation to be performed to only a subset of tones within a received signal as opposed to all of the despreader resultants (or bins) in S-CDMA.

Another difference between OFDM and S-CDMA is that, in OFDM, a transmitting device need only employ one or a relatively few number of information-free tones located in a similar proximity as the narrowband interference. In certain S-CDMA applications, many codes may be required to be information-free. However, in OFDM, a relatively small number of tones may be required to be information-free and still provide for very effective narrowband interference cancellation. Generally speaking, this is because an OFDM bin has a narrowband response (e.g., has one or a few significantly affected tones), and the narrowband response is heavily corrupted by the narrowband interference located at or near the corresponding tone frequency. The combiner weights are used to scale the information-free tones to cancel the ingress in that bin. Note that if the corresponding bin were an information-carrying bin, the narrowband response would typically be impractically large for effective signal processing and could unfortunately result in excessive noise enhancement. For this enhancement, OFDM tones located at a frequency containing interference are typically not used for data transmission. By contrast, S-CDMA codes (analogous to OFDM tones) have wideband responses. Therefore, while such interference cancellation may be performed using any desired orthogonal based signaling scheme, a particular implementation should be tailored for the particular orthogonal based signaling scheme employed.

With respect to calculating of weights used to scale the information-free tones, different approaches may be used. One approach operates using a least squares (LS) methodology, but such an approach may require relatively complex processing with large FFT block sizes. Instead of doing such an optimal processing (least squares approach), a different method may be performed by using an appropriately designed filter to construct a notch located at or around the narrowband interference. For example, assuming narrowband interference having a spectral shape corresponding to a brick wall or raised cosine shape, then, based on such an assumed narrowband interference's shape, the combiner weights used to perform scaling of one or more information-free tones may be precomputed off-line.

Figure 7:
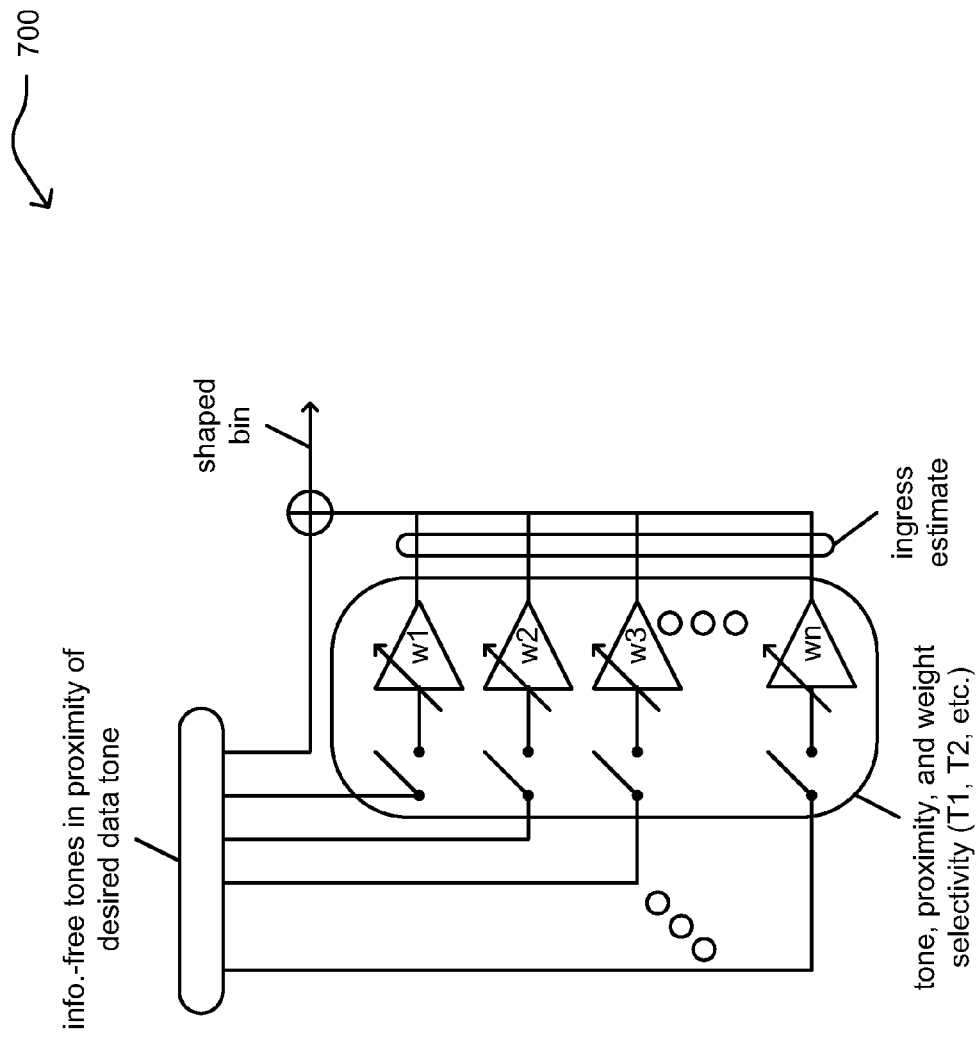
FIG. 7 is a diagram illustrating an example of signal processing to perform interference cancellation.

FIG. 7 is a diagram illustrating an example 700 of signal processing to perform interference cancellation. Different numbers of information-free tones may be used to cancel narrowband interference at different times. Also, the values of the weights (w1, w2, w3, and so on up to wn) may vary over time. As noted herein, the magnitude and location of narrowband interference may change over time for any given communication link. In addition, there may be some instances in which a communication link is devoid of any narrowband interference whatsoever. A device may adaptively select the number of information-free tones to be used for narrowband interference cancellation. Generally, a given number of information-free tones will be located at or near proximity around a desired the tone (e.g., an information-carrying tone). For relatively larger magnitude narrowband interference, a relatively larger number of information-free tones that occupy a larger proximity will be employed as compared to a relatively smaller number of information-free tones that occupy a relatively smaller proximity for relatively smaller magnitude narrowband interference.

A device including the interference cancellation capability of this diagram is able to select different numbers of information-free tones that occupy different proximities around narrowband interference as well as select different values of weights (w1, w2, w3, and so on up to wn) for use and scaling the information-free tones for use in performing interference cancellation for an information-carrying tone. Generally, different numbers of information-free tones and different valued weights may be employed based on different amounts and types of narrowband interference. Coordination may be made between two communication devices to select the number of information-free tones and associated weights, including their values, to perform effective reduction or cancellation of narrowband interference in communications between those devices.

FIG. 8A is a diagram illustrating an embodiment of a method 801 for execution by one or more communication devices. The method 801 may be viewed as being performed within a communication device that is in communication with another communication device. Via a communication interface of the communication device, the method 801 operates by receiving a first signal (e.g., an OFDM signal) from the other communication device (block 810). The method 801 continues by processing the first signal to identify narrowband interference (block 820). Such narrowband interference may be characterized as narrowband ingress (NBI), noise, interference, etc. that is generally narrowly located in terms of frequency.

If no narrowband interference has been identified (block 830), the method 801 may end. However, if narrowband interference has been identified (block 830), then the method operates by generating a second signal that includes information identifying the narrowband interference and/or one or more information-free tones for subsequent use in canceling the narrowband interference (block 840). The determination of whether or not narrowband interference is identified may be based upon comparison of any detected narrowband interference with one or more thresholds. When the detected narrowband interference exceeds one or more of the thresholds, a favorable comparison is determined, the method 801 continues from block 830 to block 840. Alternatively, when an unfavorable comparison is determined, the method 801 terminates.

Via the communication interface of the device, the method 801 continues by transmitting the second signal to the other communication device (block 850). The other communication device will then generate and transmit a third signal (e.g., another OFDM signal) to the device executing the method 801. This third signal will include one or more information-free tones to be used by the device executing the method 801 to perform narrowband interference cancellation. Via the communication interface of the device, the method 801 continues by receiving the third signal that includes the one or more information-free tones (block 860).

FIG. 8B is a diagram illustrating another embodiment of a method 802 for execution by one or more communication devices. The method 802 may also be viewed as being performed within a communication device that is in communication with another communication device.

Via a communication interface of the device, the method 802 operates by receiving an OFDM signal from the other device (block 811). This OFDM signal includes one or more information-free tones for use by the device to perform narrowband interference cancellation. The method 802 continues by scaling the one or more information-free tones to generate one or more scales tones (block 821). The method 802 then operates by combining the one or more scaled tones with one or more information-carrying tones to cancel or reduce the narrowband interference (block 831). Once the narrowband interference has been reduced or canceled from the received signal, the received signal may undergo subsequent processing including generating estimates of any information bits encoded therein.

The present invention has been described herein with reference to at least one embodiment. Such embodiment(s) of the present invention have been described with the aid of structural components illustrating physical and/or logical components and with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims that follow. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may also be used herein, the terms "processing module," "processing circuit," "processing circuitry," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a functional block, hardware, and/or software stored on memory for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A communication device comprising:
   a communication interface; and
   a processor, the processor and the communication interface configured to:
      receive a first signal based on first orthogonal frequency division multiplexing (OFDM) signaling from another communication device;
      process the first signal to identify narrowband interference;
      process the first signal to quantify the narrowband interference;
      based on the narrowband interference, generate a second signal that includes information that identifies at least one information-free tone to be included within a received subsequent signal for interference cancellation or reduction therein;
      transmit the second signal to the another communication device;
      receive a third signal transmitted based on second OFDM signaling that includes the at least one information-free tone from the another communication device;
      process the third signal to scale the at least one information-free tone to generate at least one scaled tone; and
      combine the at least one scaled tone with one or more information-carrying tones of the third signal that are located within a proximity of the at least one information-free tone to cancel or reduce the narrowband interference, wherein the proximity is based on quantification of the narrowband interference and specifies at least one information-carrying tone adjacently located to the at least one information-free tone.

2. The communication device of claim 1, wherein the second OFDM signaling of the third signal is based on a plurality of tones composed of a plurality of information-carrying tones, the at least one information-free tone, and one or more additional information-free tones adjacently located to the at least one information-free tone.

3. The communication device of claim 2 further comprising: the processor and the communication interface configured to generate the second signal with information that identifies the at least one information-free tone and the one or more additional information-free tones adjacently located to the at least one information-free tone based on quantification of the narrowband interference.

4. The communication device of claim 1 further comprising:
   a cable headend transmitter or a cable modem termination system (CMTS), wherein the another communication device is a cable modem.

5. The communication device of claim 1 further comprising:
   the processor and the communication interface configured to:
      process the third signal to scale a first information-free tone adjacently located to the narrowband interference using a first weight to generate a first scaled tone;
      process the third signal to scale a second information-free tone adjacently located to the narrowband interference using a second weight to generate a second scaled tone; and
      combine the first and second scaled tones with one or more information-carrying tones of the third signal that are located within a proximity of the first and second information-free tones to cancel or reduce the narrowband interference.

6. The communication device of claim 5 further comprising:
   a memory configured to store the first and second weights that are first and second predetermined weights.

7. The communication device of claim 1 further comprising:
   a cable modem, wherein the another communication device is a cable headend transmitter or a cable modem termination system (CMTS).

8. The communication device of claim 1 further comprising:
   the communication interface configured to support communications within at least one of a satellite communication system, a wireless communication system, a wired communication system, a fiber-optic communication system, or a mobile communication system.

9. A cable modem comprising:
   a communication interface; and
   a processor, the processor and the communication interface configured to:
      receive a first signal based on first orthogonal frequency division multiplexing (OFDM) signaling from an upstream communication device;
      process the first signal to identify and quantify narrowband interference;
      based on the narrowband interference, generate a second signal with information that identifies at least one information-free tone to be included within a received subsequent signal for interference cancellation or reduction therein;
      transmit the second signal to the upstream communication device;
      receive a third signal based on second OFDM signaling that includes the at least one information-free tone from the upstream communication device, wherein the second OFDM signaling of the third signal is based on a plurality of tones composed of a plurality of information-carrying tones, the at least one information-free tone, and one or more additional information-free tones adjacently located to the at least one information-free tone;
      process the third signal to scale the at least one information-free tone using a weight to generate at least one scaled tone; and
      combine the at least one scaled tone with one or more information-carrying tones of the third signal that are located within a proximity of the at least one information-free tone to cancel or reduce the narrowband interference, wherein the proximity is based on quantification of the narrowband interference and specifies at least one information-carrying tone adjacently located to the at least one information-free tone.

10. The cable modem of claim 9, wherein the at least one information-free tone includes one information-free tone, and the one or more information-carrying tones of the third signal that are located within the proximity of the at least one information-free tone to cancel or reduce the narrowband interference include a first information-carrying tone adjacently located on a first side of the one information-free tone and a second information-carrying tone adjacently located on a second side of the one information-free tone.

11. The cable modem of claim 9 further comprising:
a memory configured to store the weight that is a predetermined weight.

12. The cable modem of claim 9, wherein the upstream communication device is a cable headend transmitter or a cable modem termination system (CMTS).

13. The cable modem of claim 9 further comprising:
the communication interface configured to support communications within at least one of a satellite communication system, a wireless communication system, a wired communication system, a fiber-optic communication system, or a mobile communication system.

14. A method for execution by a communication device, the method comprising:
via a communication interface of the communication device, receiving a first signal using first orthogonal frequency division multiplexing (OFDM) signaling from another communication device;
processing the first signal to identify narrowband interference;
processing the first signal to quantify the narrowband interference;
based on the narrowband interference, generating a second signal with information that identifies at least one information-free tone to be included within a received subsequent signal for interference cancellation or reduction therein;
via the communication interface of the communication device:
transmitting a second signal to the another communication device;
receiving a third signal transmitted using second OFDM signaling that includes the at least one information-free tone from the another communication device;
processing the third signal to scale the at least one information-free tone to generate at least one scaled tone; and
combining the at least one scaled tone with one or more information-carrying tones of the third signal that are located within a proximity of the at least one information-free tone to cancel or reduce the narrowband interference, wherein the proximity is based on quantification of the narrowband interference and specifies at least one information-carrying tone adjacently located to the at least one information-free tone.

15. The method of claim 14, wherein the second OFDM signaling of the third signal is based on a plurality of tones composed of a plurality of information-carrying tones, the at least one information-free tone, and one or more additional information-free tones adjacently located to the at least one information-free tone.

16. The method of claim 15 further comprising:
based on quantification of the narrowband interference, generating the second signal with information that identifies the at least one information-free tone and the one or more additional information-free tones adjacently located to the at least one information-free tone.

17. The method of claim 14, wherein the communication device is a cable headend transmitter or a cable modem termination system (CMTS), and the another communication device is a cable modem.

18. The method of claim 14 further comprising:
processing the third signal to scale a first information-free tone adjacently located to the narrowband interference using a first weight to generate a first scaled tone;
processing the third signal to scale a second information-free tone adjacently located to the narrowband interference using a second weight to generate a second scaled tone; and
combining the first and second scaled tones with one or more information-carrying tones of the third signal that are located within a proximity of the first and second information-free tones to cancel or reduce the narrowband interference.

19. The method of claim 14, wherein the communication device is a cable modem, and the another communication device is a cable headend transmitter or a cable modem termination system (CMTS).

20. The method of claim 14 further comprising:
operating the communication interface of the communication device to support communications within at least one of a satellite communication system, a wireless communication system, a wired communication system, a fiber-optic communication system, or a mobile communication system.

* * * * *